US010255464B2

(12) United States Patent
Terra et al.

(10) Patent No.: US 10,255,464 B2
(45) Date of Patent: Apr. 9, 2019

(54) SYSTEMS AND METHODS FOR DETERMINING CLOCK RATES FOR COMMUNICATING WITH PROCESSING DEVICES

(71) Applicant: Square, Inc., San Francisco, CA (US)

(72) Inventors: David Terra, San Francisco, CA (US); Ross Glashan, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/824,945

(22) Filed: Nov. 28, 2017

(65) Prior Publication Data

US 2018/0218181 A1 Aug. 2, 2018

Related U.S. Application Data

(63) Continuation of application No. 15/420,730, filed on Jan. 31, 2017, now Pat. No. 9,858,448.

(51) Int. Cl.
*G06K 7/00* (2006.01)
*G06K 7/016* (2006.01)
*G06K 7/06* (2006.01)
*G06K 19/07* (2006.01)

(52) U.S. Cl.
CPC ............. *G06K 7/016* (2013.01); *G06K 7/06* (2013.01); *G06K 19/0701* (2013.01)

(58) Field of Classification Search
CPC . G06K 7/00; G06K 19/00; G06F 3/06; H04N 1/33
See application file for complete search history.

(56) References Cited

U.S. PATENT DOCUMENTS

| 4,150,784 A | 4/1979 | Moorman et al. |
| 5,798,507 A | 8/1998 | Kawagishi et al. |
| 6,098,888 A | 8/2000 | Praden |

(Continued)

FOREIGN PATENT DOCUMENTS

| AU | 2017245444 A1 | 11/2017 |
| CA | 2 968 660 A1 | 5/2016 |

(Continued)

OTHER PUBLICATIONS

Notice of Allowance dated Feb. 5, 2018, for U.S. Appl. No. 15/421,373, of Terra, D., et al., filed Jan. 31, 2017.

(Continued)

*Primary Examiner* — Daniel A Hess
(74) *Attorney, Agent, or Firm* — Maynard Cooper & Gale, PC; Jon E. Holland, Esq.

(57) ABSTRACT

A payment terminal such as a payment reader may receive and form electrical connections with an electronic transaction card such as an EMV chip card. The payment terminal may provide a clock signal at a rate that exceeds a specified rate for the EMV chip card. The payment terminal may transmit messages to the EMV chip card and monitor receive messages at a data connection. The payment terminal may determine that the clock rate is excessive based on a timeout of a receive message, an error rate of a receive message, or a receive message indicating that one of the transmit messages was not received by the EMV card. The payment terminal may reduce the clock rate to a rate that is below the specified rate for the EMV chip card.

28 Claims, 7 Drawing Sheets

(56) References Cited

U.S. PATENT DOCUMENTS

| | | |
|---|---|---|
| 6,378,073 B1 | 4/2002 | Davis et al. |
| 6,426,944 B1 | 7/2002 | Moore |
| 6,702,182 B1 | 3/2004 | Kanayama |
| 7,370,804 B2 | 5/2008 | Ishii |
| 7,712,670 B2 | 5/2010 | Sauerwein, Jr. et al. |
| 9,088,403 B1 | 7/2015 | Caggioni et al. |
| 9,286,494 B1 | 3/2016 | Lamfalusi et al. |
| 9,317,848 B2 | 4/2016 | Hammad |
| 9,424,445 B2 | 8/2016 | Lamfalusi et al. |
| 9,652,641 B2 | 5/2017 | Lamfalusi et al. |
| 9,721,123 B1 | 8/2017 | Wade |
| 9,760,743 B2 | 9/2017 | Lamfalusi et al. |
| 9,858,448 B1 | 1/2018 | Terra et al. |
| 10,002,268 B1 | 6/2018 | Terra et al. |
| 2001/0029595 A1* | 10/2001 | Murata ............... H04N 1/3333 714/746 |
| 2002/0060249 A1 | 5/2002 | Perron |
| 2003/0067940 A1 | 4/2003 | Edholm |
| 2004/0124246 A1 | 7/2004 | Allen et al. |
| 2005/0156026 A1 | 7/2005 | Ghosh et al. |
| 2005/0184164 A1 | 8/2005 | De Jong |
| 2006/0192542 A1 | 8/2006 | Uguen |
| 2007/0012763 A1 | 1/2007 | Van de Velde et al. |
| 2007/0260638 A1 | 11/2007 | Madsen et al. |
| 2008/0189547 A1 | 8/2008 | Sugiyama |
| 2008/0238679 A1 | 10/2008 | Rofougaran et al. |
| 2008/0245851 A1 | 10/2008 | Kowalski |
| 2008/0301030 A1 | 12/2008 | Boss et al. |
| 2008/0301050 A1 | 12/2008 | DiGioacchino |
| 2009/0006262 A1 | 1/2009 | Brown |
| 2009/0043918 A1 | 2/2009 | Schroeder |
| 2009/0132852 A1 | 5/2009 | Sekiya |
| 2009/0283600 A1 | 11/2009 | Chang et al. |
| 2010/0224684 A1 | 9/2010 | Bonnin et al. |
| 2010/0252624 A1 | 10/2010 | Van de Velde et al. |
| 2010/0253482 A1 | 10/2010 | Catala Mora et al. |
| 2011/0179494 A1 | 7/2011 | Adams et al. |
| 2011/0244799 A1 | 10/2011 | Roberts et al. |
| 2012/0017106 A1 | 1/2012 | Curren et al. |
| 2012/0126009 A1 | 5/2012 | Osen et al. |
| 2012/0159207 A1 | 6/2012 | Chao et al. |
| 2012/0166344 A1 | 6/2012 | Cheng et al. |
| 2012/0173817 A1 | 7/2012 | Jiang et al. |
| 2012/0185397 A1 | 7/2012 | Levovitz |
| 2012/0215830 A1 | 8/2012 | Anguiano |
| 2012/0226601 A1 | 9/2012 | Cole et al. |
| 2013/0006847 A1 | 1/2013 | Hammad et al. |
| 2013/0095755 A1 | 4/2013 | Moreton et al. |
| 2013/0248601 A1 | 9/2013 | Liang et al. |
| 2013/0299574 A1 | 11/2013 | Theobald |
| 2014/0052637 A1 | 2/2014 | Jooste et al. |
| 2014/0189359 A1 | 7/2014 | Marien et al. |
| 2014/0217169 A1 | 8/2014 | Lewis et al. |
| 2014/0289465 A1* | 9/2014 | Sudou ............... G06F 3/0611 711/115 |
| 2014/0331072 A1 | 11/2014 | Osen et al. |
| 2016/0306977 A1 | 10/2016 | Zarakas et al. |
| 2016/0307189 A1 | 10/2016 | Zarakas et al. |
| 2017/0028693 A1 | 2/2017 | Free et al. |
| 2017/0242961 A1 | 8/2017 | Shukla et al. |
| 2018/0189771 A1 | 7/2018 | Terra |
| 2018/0189772 A1 | 7/2018 | Terra |
| 2018/0240103 A1 | 8/2018 | Rezayee et al. |
| 2018/0240117 A1 | 8/2018 | Rezayee et al. |

FOREIGN PATENT DOCUMENTS

| | | |
|---|---|---|
| EP | 1 431 861 A2 | 6/2004 |
| WO | 01/01300 A1 | 1/2001 |
| WO | 2009/149715 A1 | 12/2009 |
| WO | 2013/051032 A1 | 4/2013 |
| WO | 2015/001468 A1 | 1/2015 |
| WO | 2016/081804 A1 | 5/2016 |
| WO | 2018/125808 A1 | 7/2018 |
| WO | 2018/144591 A1 | 8/2018 |
| WO | 2018/156742 A1 | 8/2018 |

OTHER PUBLICATIONS

Notice of Allowance dated Aug. 23, 2017, for U.S. Appl. No. 15/420,730, of Terra, D., et al., filed Jan. 31, 2017.
Non-Final Office Action dated Sep. 16, 2015, for U.S. Appl. No. 14/549,338, of Lamfalusi, M.C., et al., filed Nov. 20, 2014.
Notice of Allowance dated Nov. 10, 2015, for U.S. Appl. No. 14/549,338, of Lamfalusi, M.C., et al., filed Nov. 20, 2014.
Non-Final Office Action dated Jan. 14, 2016, for U.S. Appl. No. 14/947,162, of Lamfalusi, M.C., et al., filed Nov. 20, 2015.
Notice of Allowance dated Mar. 25, 2016, for U.S. Appl. No. 14/947,162, of Lamfalusi, M.C., et al., filed Nov. 20, 2015.
Non-Final Office Action dated Aug. 25, 2016, for U.S. Appl. No. 15/220,262, of Lamfalusi, M.C., et al., filed Jul. 26, 2016.
Non-Final Office Action dated Aug. 25, 2016, for U.S. Appl. No. 15/221,383, of Lamfalusi, M.C., et al., filed Jul. 27, 2016.
Notice of Allowance dated Jan. 5, 2017, for U.S. Appl. No. 15/220,262, of Lamfalusi, M.C., et al., filed Jul. 26, 2016.
Ex Parte Quayle Action mailed Jan. 26, 2017, for U.S. Appl. No. 14/967,108, of Wade, J., filed Dec. 11, 2015.
Notice of Allowance dated Mar. 22, 2017, for U.S. Appl. No. 14/967,108, of Wade, J., filed Dec. 11, 2015.
Non-Final Office Action dated Apr. 12, 2017, for U.S. Appl. No. 15/396,609, of Terra, D., filed Dec. 31, 2016.
Notice of Allowance dated Apr. 21, 2017, for U.S. Appl. No. 15/221,383, of Lamfalusi, M.C., et al., filed Jul. 27, 2016.
Final Office Action dated Nov. 15, 2017, for U.S. Appl. No. 15/396,609, of Terra, D., filed Dec. 31, 2016.
Examination Report No. 1 for Australian Patent Application No. 2017245444, dated Dec. 1, 2017.
Examiner Requisition for Canadian Patent Application No. 2,968,660, dated Mar. 2, 2018.
Non-Final Office Action dated Jul. 26, 2018, for U.S. Appl. No. 14/868,221, of Wade, J., et al., filed Sep. 28, 2015.
Non-Final Office Action dated Aug. 13, 2018, for U.S. Appl. No. 15/396,609, of Terra, D., filed Dec. 31, 2016.
Notice of Acceptance for Australian Patent Application No. 2017245444, dated Aug. 29, 2018.
Non-Final Office Action dated Aug. 31, 2018, for U.S. Appl. No. 15/650,713, of Wade, J., filed Jul. 14, 2017.
International Search Report and Written Opinion for International Application No. PCT/US2015/061771 dated Jan. 29, 2016.
International Search Report and Written Opinion for International Application No. PCT/US2017/068220, dated Apr. 10, 2018.
International Search Report and Written Opinion for International Application No. PCT/US2018/016219, dated Apr. 30, 2018.
International Search Report and Written Opinion for International Application No. PCT/US2018/019191, dated May 30, 2018.

* cited by examiner

SYSTEMS AND METHODS FOR DETERMINING CLOCK RATES FOR COMMUNICATING WITH PROCESSING DEVICES

CROSS-REFERENCE TO RELATED APPLICATION

This application is a continuation of U.S. Pat. No. 9,858,448 filed on Jan. 31, 2017, now U.S. Pat. No. 9,858,448 entitled "COMMUNICATION PROTOCOL SPEEDUP AND STEP-DOWN", which is incorporated herein by reference.

BACKGROUND

Electronic transaction processing systems may utilize a payment terminal. The payment terminal can process payment transactions and interact with payment devices such as a payment card having a magnetic strip that is swiped in a magnetic reader of the payment terminal, a payment device having a Europay/Mastercard/Visa (EMV) chip that is inserted into a corresponding EMV slot of the payment terminal, and near field communication (NFC) enabled devices such as a smart phone or EMV card that is tapped at the payment terminal and transmits payment information over a secure wireless connection.

Electronic devices such as electronic cards may store information that may be used for communications and processing of transactions. For example, EMV cards may have an EMV chip located on the EMV card. The EMV card may not have its own power and clock source, and may receive its power and clock signal from another device such as a payment terminal. The EMV chip may interface with a device such as the payment terminal or a portion thereof, which may provide a clock source for the EMV chip, e.g., by connecting clock, power and ground pins of the EMV chip to a clock source, power source, and ground of the payment terminal. Once the EMV chip is connected to a power source, it may communicate with the payment reader or terminal via one or more data lines at a rate determined by clock rate of the clock source. In this manner, the EMV chip may exchange information as required to complete a transaction such as a payment transaction.

The EMV chip and payment reader or terminal may begin exchanging messages after power is applied to the EMV chip. A speed at which information such as encrypted payment information may be exchanged depends on the clock rate of the clock source signal. In the case of payment transactions, exchanging the requisite number of messages between EMV chip and payment reader or terminal for performing transaction processing may take a number of clock cycles to complete. During this time, the EMV chip and the payment terminal must remain connected in order to maintain the power, clock, and data connections.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
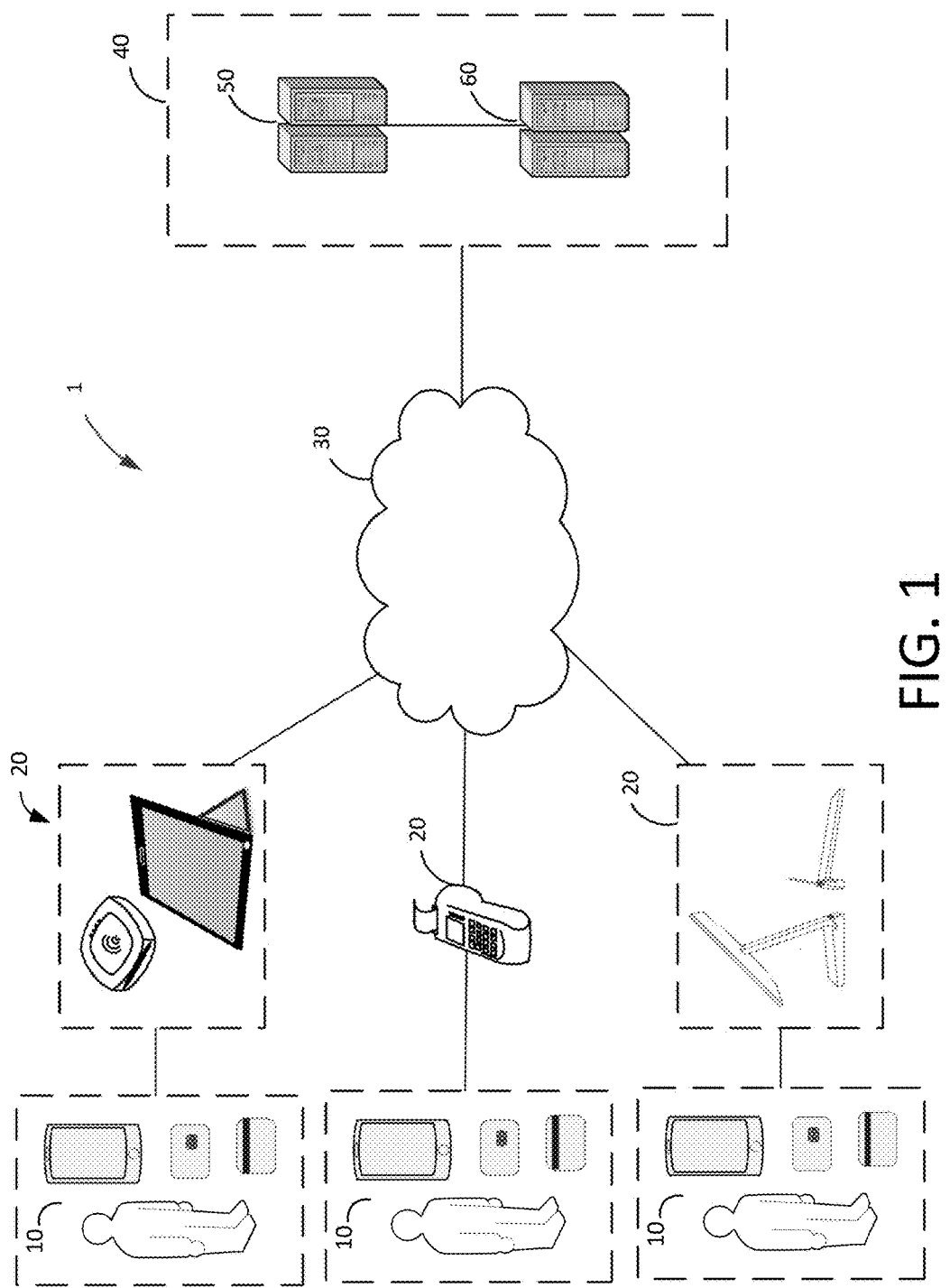
FIG. 1 shows an illustrative block diagram of a payment system in accordance with some embodiments of the present disclosure.

An electronic transaction card such as an EMV card has a chip (e.g., an EMV chip) embedded in or on the chip. The EMV chip may be an externally-driven processing device that receives signals necessary to operate the EMV chip (e.g., power, ground, and clock signals) from an external source. The chip has contacts that can be accessed by a reader device such as a payment terminal, for example, by inserting the EMV card into an EMV slot. When properly placed in the slot, the chip contacts will physically contact corresponding contacts of the reader device. The physical contacts provide power to the chip, which in turn allows processing circuitry and memory of the EMV card to begin to function. In addition, the EMV chip may receive a clock signal that is used as a clock source for the EMV chip. The speed at which the EMV card processes payment transactions and exchanges messages is based on the clock rate of the received clock signal.

A payment terminal may select a first clock rate at which to provide the clock signal to the EMV chip of the EMV card. The first clock rate may correspond to a first clock rate that approaches an upper limit for the clock rate for which the EMV card can function properly, e.g., without generating errors in data processing or communications. This first clock rate may be selected based on known information about a particular card, a particular card type, a type of merchant, a type of transaction, statistics about queues, environmental information, and other related information that is relevant to determining the clock rate at which the EMV card can operate correctly and whether it is desirable to speed up transactions to reduce wait time under particular circumstances. In an embodiment, the first clock rate may "overclock" the EMV card, such that the first clock rate is greater than a specified clock rate for the EMV card.

The payment terminal monitors information about the EMV card such as messages and data received from the EMV chip. Based on information such as whether messages are received from the EMV chip, bit errors in messages received from the EMV chip, acknowledgement messages, requests to re-send messages to the EMV chip, corrupt payload data in received messages, it may be determined whether the EMV chip is able to function properly at the first clock rate. Depending on how well the EMV chip functions at the first clock rate, the clock rate may be increased or decreased. The degree of the increase or decrease may be based on known information as described above, for example, based on known card information, transaction types, merchant types, environment information, and other related information. This process may be repeated until an appropriate clock rate for the EMV chip is determined.

Any data that is successfully received while communicating at particular clock rates may be cached by the payment terminal. In this manner, the payment terminal may continue to process current transactions while modifying the clock rate as desired, e.g., without having to restart the payment transaction. The known information may also be stored, in order to better determine appropriate starting clock rates and changes in clock rates for different cards, card types, transaction types, environmental conditions, and other relevant conditions. In some embodiments, rules for determining initial clock rates and for modifying clock rates may be determined at a remote device such as a payment service system. Some of the processing may be determined by the remote device, or in some instances, the rules may be updated at the payment terminal based on software and firmware updates.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an externally-driven processing device such as an EMV chip, or a NFC-enabled electronic device such as a smart phone running a payment application. The merchant has a payment terminal 20 such as a merchant device, payment reader, standalone terminal, combined customer/merchant terminals, electronic device (e.g., smart phone) running a point-of-sale application, or other electronic device that is capable of processing payment information (e.g., encrypted payment card data and user authentication data) and transaction information (e.g., purchase amount and point-of-purchase information).

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

During transactions involving an EMV card, the EMV card may be inserted into a card slot of the payment terminal. The terminal may make a number of electrical connections with the EMV card including, inter alia, a power line, a ground line, a clock source line and a data line. The EMV card may have a processing element that is powered by the power and ground lines, and that performs various functions in conjunction with the payment terminal, such as encryption and communication of card and transaction information, for example via an authorization request cryptogram (ARQC) and other transaction information. The payment terminal may provide a clock signal to the EMV card via the card slot, which in turn establishes a data processing speed based on the clock rate of the provided clock signal. In addition, the EMV card and payment terminal exchange information that allows them to perform transaction processing, such as a process options data object list (PDOL) provided from the terminal and application interchange profile (AIP) and application file locator (AFL) provided by the EMV card.

EMV cards may include a specified clock rate for the particular processing element (e.g., chip) embedded in the EMV card. Some EMV cards may have chips rated at a higher specified clock rate than others. EMV cards having chips rated at various specified clock signal frequencies may be used as payment methods during payment transactions with the payment reader. In some embodiments, the specified clock rates may not accurately correspond to functional clock rates for the EMV card. For example, particular EMV cards may be functional at clock rates that are significantly greater than the specified clock rate. Allowable clock rates may also be impacted by other factors, such as environmental factors (e.g., temperature, humidity, etc.) or factors relating to transactions (e.g., greater error tolerance for lower-value transactions).

In some embodiments, the payment terminal may be configured to take advantage of an EMV card's ability to function at a clock rate that is greater than the specified clock rate, by provide a clock signal at an increased clock rate. The EMV card may then perform its internal processing and exchange data messages based on the increased clock rate. The payment terminal may monitor the performance of the EMV card and other related factors or information, and based on the monitored performance may modify (e.g., increase or decrease) the clock rate as is appropriate. For example, by exchanging messages via the data line connection to the EMV card, the type of messages (e.g., failed messages, acknowledgement messages, requests to re-send messages) and underlying payload data may be analyzed to set an appropriate clock rate. By tailoring the clock rate to the EMV card and other related operating conditions, the overall transaction time may be decreased.

Figure 2:
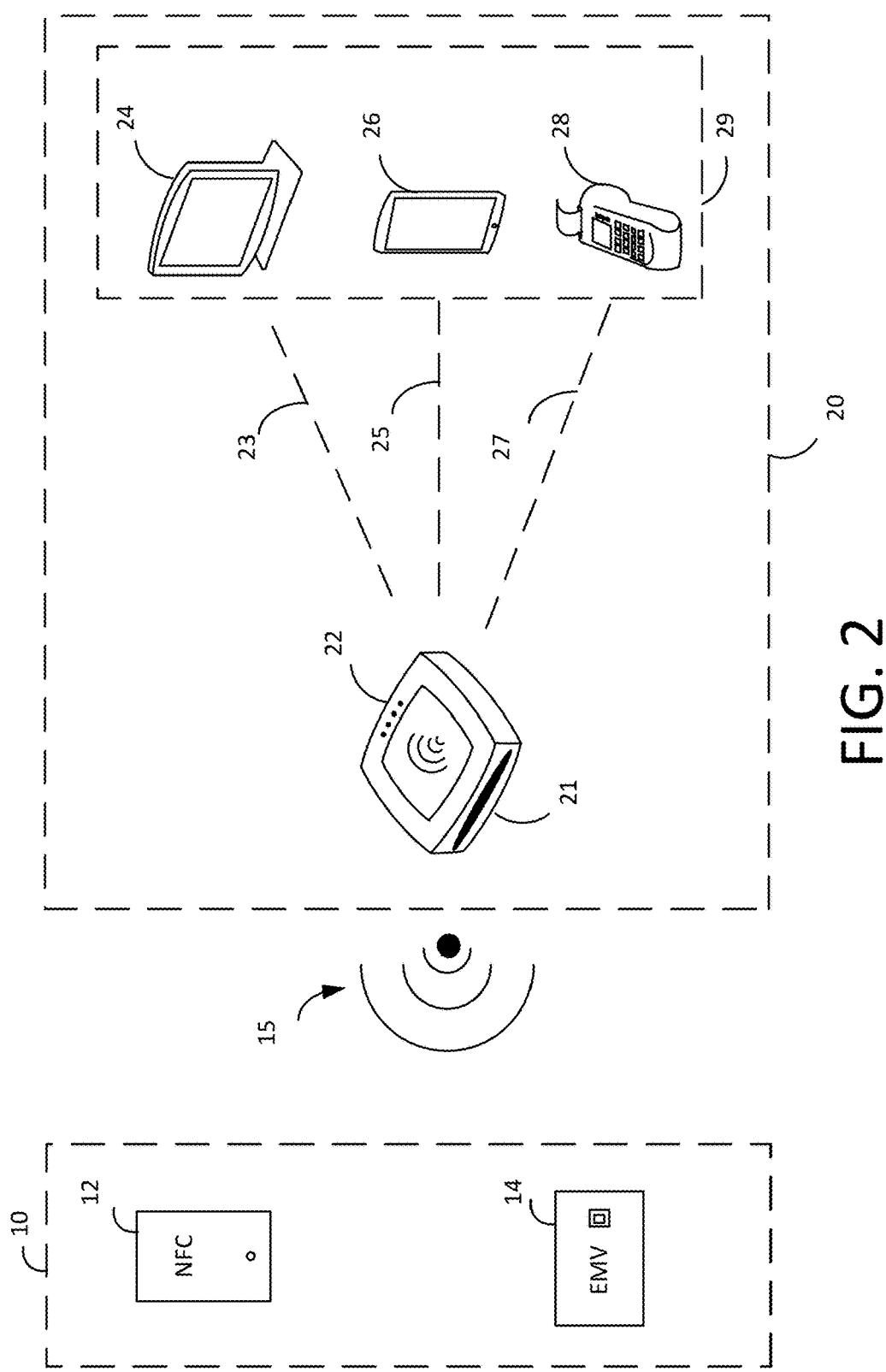
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term payment terminal may refer to any suitable component of the payment terminal, such as payment reader 22. In an embodiment, the payment reader 22 of payment terminal 20 may be a device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. In some embodiments, chip card 14 may include an EMV chip that is an externally-driven processing device that receives signals necessary to operate the EMV chip (e.g., power, ground, and clock signals) from an external source. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power and a clock signal to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
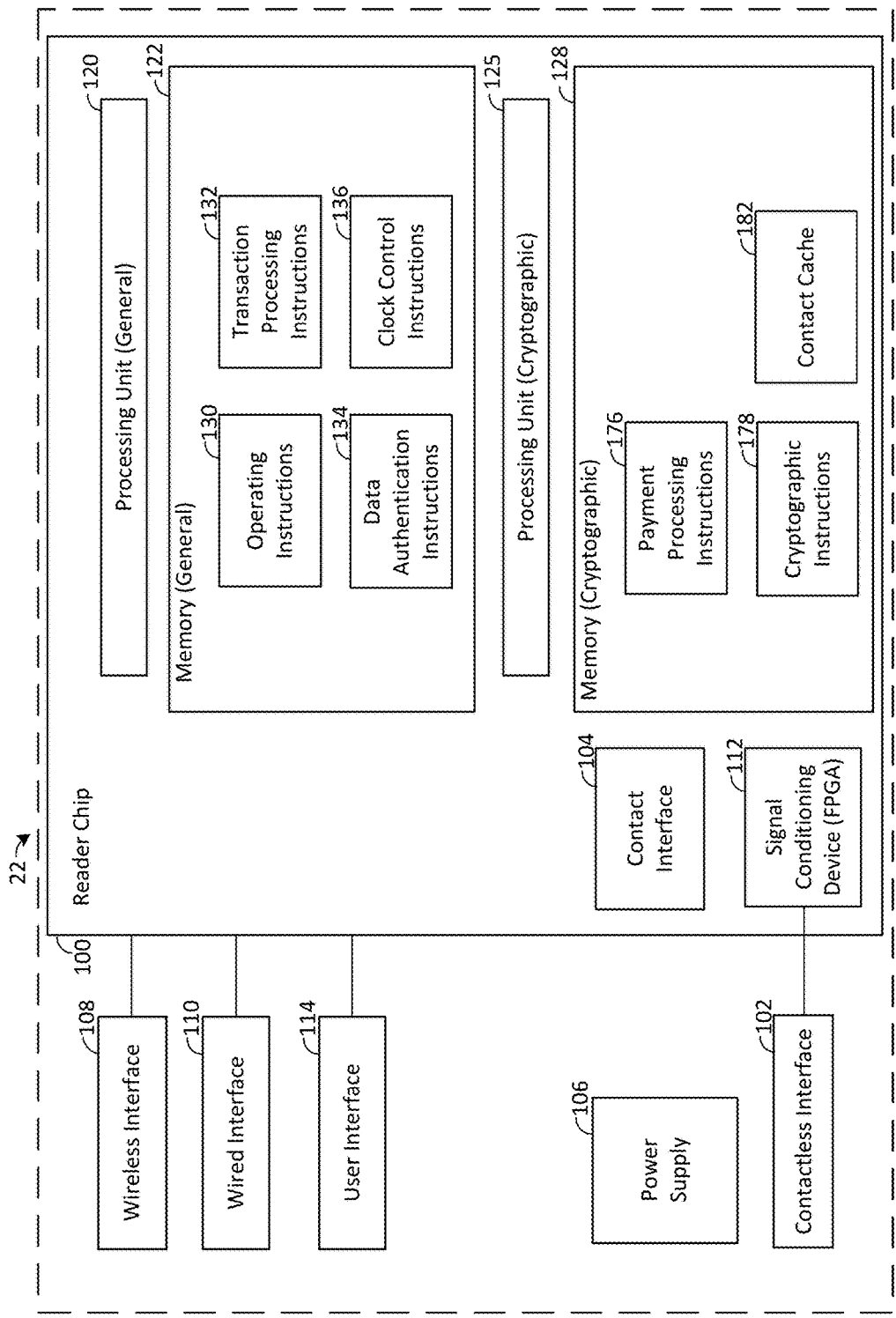
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. In one embodiment, payment reader 22 may be a device that communicates with an interactive electronic device such as a merchant device 29, for example, using USB, Bluetooth classic, or Bluetooth low energy. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in a suitable manner. In one embodiment, payment reader 22 includes a reader chip 100, a plurality of payment interfaces (e.g., a contactless interface 102 and a contact interface 104), a power supply 106, a wireless communication interface 108, a wired communication interface 110, a signal conditioning device 112, and a user interface 114. Payment reader 22 may also include a general processing unit 120 (e.g., a terminal/reader processing unit), general memory 122, a cryptographic processing unit 125 and cryptographic memory 128. Although in one embodiment the processing units and memories will be described as packaged in a reader chip 100, and configured in a particular manner, it will be understood that general processing unit 120, general memory 122, a cryptographic processing unit 125 and cryptographic memory 128 may be configured in any suitable manner to perform the functionality of the payment reader 22 as is described herein. It will also be understood that the functionality of reader chip 100 may be embodied in a single chip or a plurality of chips, each including any suitable combination of processing units and memory to collectively perform the functionality of reader chip 100 described herein.

Processing unit 120 of reader chip 100 of payment reader 22 may be a suitable processor and may include hardware, software, memory, and circuitry as is necessary to perform and control the functions of payment reader 22. Processing unit 120 may include one or more processors, and may perform the operations of reader chip 100 based on instructions in any suitable number of memories and memory types. In some embodiments, processing unit 120 may have multiple independent processing units, for example a multi-core processor or other similar component. Processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an exemplary embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry (not depicted) such as interface circuitry, analog front end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired communication interface 110 (e.g., USB, Ethernet, FireWire, and Lightning), circuitry for interfacing with other communication interfaces or buses (e.g., I$^2$C, SPI, UART, and GPIO), and circuitry for interfacing with a power supply 106 (e.g., power management circuitry, power conversion circuitry, rectifiers, and battery charging circuitry).

In an exemplary embodiment, reader chip 100 may perform functionality relating to processing of payment transactions, interfacing with payment devices, cryptography, and other payment-specific functionality. In some embodiments, reader chip 100 may include a cryptographic processing unit 125 for handling cryptographic processing operations. Note that each of general processing unit 120 and cryptographic processing unit 125 may have dedicated memory associated therewith (i.e., general memory 122 and cryptographic memory 128). In this manner, specific cryptographic processing and critical security information (e.g., cryptographic keys, passwords, user information, etc.), may be securely stored by cryptographic memory 128 and processed by cryptographic processing unit 125.

One or both of general processing unit 120 and cryptographic processing unit 125 of reader chip 100 may communicate with the other (e.g., processing unit 120 may communicate with cryptographic processing unit 125 and vice versa), for example, using any suitable internal bus and communication technique. In an embodiment, software routines running on each of the processing units may communicate with each other to exchange information, such as transaction processing information, requests for information, data objects, records, files, and similar information as described herein. In this manner, reader chip 100 can process transactions and communicate information regarding processed transactions (e.g., with merchant device 29).

Reader chip 100 may also include circuitry for implementing a contact interface 104 (e.g., power and communication circuitry for directly interfacing with an externally-driven processing device such as an EMV chip of a chip card 14 that is inserted into slot 21). For example, reader chip 100 may include circuitry to provide power and ground to an EMV chip that is inserted into contact interface 104, and in some embodiments, a variable clock output (e.g., a frequency divider, voltage controlled oscillator, or other similar circuitry). In some embodiments, reader chip 100 also may also include analog front end circuitry for interfacing with the analog components of contactless interface 102 (e.g., electromagnetic compatibility (EMC) circuitry, matching circuits, modulation circuitry, and measurement circuitry).

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

Contact interface 104 may be a suitable interface for providing power to an externally-driven processing device such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card 14 are able to exchange information such as record request, payment information, and transaction information. In addition, the payment reader may control a processing speed of the chip card 14 by adjusting the rate of a clock signal provided to the chip card 14 via clock pin. Note that, in some embodiments, contact interface 104 may be housed on reader chip 100 and may communicate with the various components of reader chip 100 via any suitable means (e.g., a common internal bus).

Power supply 106 may include one or more power supplies such as a physical connection to AC power, DC power, or a battery. Power supply 106 may include power conversion circuitry for converting an AC or DC power source into a plurality of DC voltages for use by components of payment reader 22. When power supply 106 includes a battery, the battery may be charged via a physical power connection, via inductive charging, or via any other suitable system. Although not depicted as physically connected to the other components of the payment reader 22 in FIG. 3, power supply 106 may supply a variety of voltages to the components of the payment reader 22 in accordance with the requirements of those components.

Wireless communication interface 108 may include suitable wireless communications hardware (e.g., antennas, matching circuitry, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may include a processing unit (not depicted) and memory (not depicted).

Wired communication interface 110 may include any suitable interface for wired communication with other devices or a communication network, such as USB, Lightning, FireWire, Ethernet, any other suitable wired communication interface, or any combination thereof. In some embodiments, wired communication interface 110 may allow payment reader to communicate with one or both of merchant device 29 and payment server 40.

In some embodiments, reader chip 100 may include a signal conditioning device 112. Although signal conditioning device 112 may include any suitable hardware, software, or any combination thereof, in an exemplary embodiment signal conditioning device 112 may comprise an FPGA. Signal condition device 112 may receive and condition signals sent from contactless interface 102, such as when a payment device 10 using NFC communication communicates with payment reader 22.

Payment reader may also include a user interface 114. User interface 114 may provide one or more suitable systems for a user to interact with the payment reader 22, such as buttons, a touch pad, a touch screen, a microphone, a speaker, a screen, a camera, a keyboard, or any suitable combination thereof. User interface 114 may allow the user to initiate actions of the payment reader 22 (e.g., initiating a reset mode, a sleep mode, a power-down, a low-power mode, or a transaction) and to respond to requests for information from the payment reader 22.

In some embodiments, general memory 122 may be any suitable memory as described herein, and may include a plurality of sets of instructions for controlling operations of payment reader 22 and performing general transaction processing operations of payment reader 22, such as operating instructions 130, transaction processing instructions 132, data authentication instructions 134, and Clock control instructions 136.

Operating instructions 130 may include instructions for controlling general operations of the payment reader 22, such as internal communications, power management, processing of messages, system monitoring, sleep modes, user interface response and control, operation of the contact interface 104, the wireless interface 108, the wired interface 110, or the signal conditioning device 112, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, and invoking the various resources of reader chip 100 to process that payment information (e.g., by executing instructions stored in cryptographic memory 128 using cryptographic processing unit 125), and by generating responsive messages that are transmitted to the point-of-sale application of the merchant device 29 via wireless communication interface 108 and wired communication interface 110.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction and exchange information as described herein (e.g., for storing information and rules relating to control of a clock signal to the contact interface 104).

Transaction processing instructions 132 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and any other suitable aspects of transaction processing.

Transaction processing instructions 132 also may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and other suitable information related to the processing of payment transactions. In some embodiments, transaction processing instructions 132 may perform high level processing, and provide instructions for processing unit 120 to communicate with cryptographic processing unit 125 to perform most transaction processing operations, such as acquisition of records from the EMV card. In addition, transaction processing instructions 132 may provide instructions for acquiring any suitable information from a chip card (e.g., via contact interface 104 and cryptographic processing unit 125) such as authorization responses, card user name, card expiration, etc.

Data authentication instructions 134 may include instructions for providing configuration information for a payment terminal 20. The configuration information may include suitable information such as payment limits and types of transactions for local transactions (i.e., transactions that occur without contacting a payment server 40) and supported applications. As an example, in some embodiments, data authentication instructions 134 may include configuration instructions such as TMS-CAPK instructions. In some embodiments, the TMS-CAPK may be tailored for a particular jurisdiction (e.g., country-specific).

In an embodiment, Clock control instructions 136 may comprise instructions that when executed by a processing unit (e.g., processing unit 120) may adjust a clock speed or other characteristics of the clock signal that is provided to an EMV chip of an EMV card via a CLK pin of contactless interface. Although Clock control instructions 136 will be described herein as providing the clock signal to an EMV card in the present disclosure, it will be understood that the instructions may similarly provide a modifiable clock signal to other components or circuits (e.g., any suitable chip or components that are perform clocked operations based on an externally-provided clock signal). As described herein, characteristics of the provided clock signal (e.g., rate, duty cycle, slew rate, etc.) may be modified based on the clock control instructions 136 to provide for optimal timing and operation of the device or chip that receives the clock signal.

In an embodiment, the speed at which operations of the EMV chip of an exemplary EMV card are performed is modified by adjusting the clock rate of the clock signal that is provided to a chip card 14 inserted into the payment reader 22, such as via contact interface 104. As noted above, some EMV chip cards may be capable of performing internal operations and interpreting and generating messages (e.g., messages communicated via an I/O pin of contact interface 104) at different rates based on a variety of factors such as card type, wear upon the card, environmental conditions, transaction type, or other similar factors. Clock control instructions 136 may include instructions for exchanging messages with such cards by increasing a clock rate provided to the data connection (e.g., EMV chip card data pin) to attempt to communicate messages with the EMV card at a higher clock rate.

Clock control instructions 136 may include instructions for initially selecting a clock signal with a clock rate and providing the clock signal to the EMV chip card via the clock signal connection. Clock control instructions 136 may select the clock signal based on various information, such as previous uses, transaction information, customer identity, merchant information, or otherwise. In some embodiments, Clock control instructions 136 may include instructions for selecting a clock rate of the clock signal based on information stored at a merchant device 29, a remote server, such as payment server 40 of payment service system 50, or other source. For example, a clock signal may be selected based on information generated from analysis of transaction histories for a particular scenario, such as time of day, location, merchant identification, environmental factors, goods or services for purchase, or other similar factors. Note that, in some embodiments, such information may be predictive in nature based on analysis of previous transactions and purchases.

Clock control instructions 136 may include instructions for selecting a clock signal having a clock rate that exceeds a specified clock rate for an EMV card. As noted herein, some EMV chip cards may be capable of executing instructions and exchanging messages at a higher clock rate than other EMV cards or than their specified clock rate. Clock control instructions 136 may include instructions for attempting to initially provide a clock signal with a high clock rate. In this manner, use of a higher clock rate for performing operations and exchanging messages with the EMV card may enable the EMV card to perform processing operations more quickly and for the payment reader 22 to communicate with the EMV card more quickly to decrease transaction time.

In some embodiments, clock control instructions 136 may include instructions for monitoring a data connection (e.g., at contact interface 104) for one or more messages received from the EMV card. The received messages may be received based on transmitted messages provided to the data connection (e.g., based on transaction processing instructions 132 or otherwise). The one or more receive messages may include various information, such as an authorization request cryptogram (ARQC), acknowledgements, data records, requests for a transmitted message to be re-sent, and other related data and information.

Clock control instructions 136 may include instructions for determining that a clock rate of the clock signal provided to the EMV card is excessive. Clock control instructions 136 may include instructions for determining that the clock rate is excessive based on various information available at the payment reader 22. For example, in some embodiments, a clock rate may be determined to be excessive based on failure to receive one of the one or more receive messages within a message timeout threshold, an excessive number of failed transmitted messages, incorrect data within the payload of received messages, and other similar information. A response threshold may relate to a duration within which the receive message should have been received following transmission of a corresponding transmit message of the one or more transmit messages. A response threshold may be based on other information in other embodiment, and may be determined for one or a plurality of the one or more receive messages by analysis of various information about transactions, merchants, customers, locations, EMV card types or otherwise. Other thresholds may relate to how often communication errors, percentages of failed or incorrect payload data, and other similar information relating to the quality of the processing and communications of the EMV chip.

As another example, in some embodiments, clock control instructions 136 may include instructions for determining that a clock rate is excessive based on receiving one of the one or more receive messages that has an error rate that exceeds an error rate threshold. Clock control instructions 136 may include instructions for comparing an error rate for each receive message of the one or more receive messages and comparing it with an error rate threshold stored at the payment reader 22 (e.g., in clock control instructions 136 in memory 122). If a receive message has an associated error rate that does not exceed the error rate threshold, payment reader 22 may determine that the clock rate used for processing the receive message is not excessive. If the receive message has an associated error rate that exceeds the error rate threshold, the payment reader 22 may determine that the clock rate used for processing the receive message is excessive. Note that the error rate threshold may be based on various information, and may be determined for one or a plurality of the one or more receive messages by analysis of various information about transactions, merchants, customers, locations, EMV card types or otherwise.

As yet another example, in some embodiments, clock control instructions 136 may include instructions for determining that a clock rate is excessive based on failure of the EMV card to receive a transmit message. Clock control instructions 136 may include instructions for noting information in each of the one or more receive messages received from the EMV card and comparing it with information in a corresponding transmit message from the one or more transmit messages. If the information in the receive message indicates that a transmit message was not received (e.g., if a correlation threshold or rule is not satisfied or otherwise), a determination that the transmit message was not received by the EMV card may be made. Clock control instructions 136 may include instructions for determining that a transmit message was not received by the EMV card based on other information in other embodiments.

Clock control instructions 136 may include instructions for providing the clock signal at a second clock rate based on the determination that the initial clock rate was excessive for the proper operation of the EMV chip. In some embodiments, the second clock signal may have a second clock rate that is less than or equal to the specified clock rate for the EMV card. In some embodiments, the second clock signal may be selected based on analysis of various information about transactions, merchants, customers, locations, environmental information, EMV card types or other related information. In an embodiment, the determination of the second clock rate may be based on a severity of the errors (e.g., based on a degree to which the thresholds for response messages or data errors were exceeded at the first clock rate).

In some embodiments, sufficient information to determine a second clock rate that is less the initial clock rate but optimized for the particular chip card (e.g., that does not have an excessively low clock rate) may be unavailable. Clock control instructions 136 may include instructions for providing iteratively reducing the clock rate of a provided clock signal each time a determination is made that the clock rate is excessive. For example, clock control instructions 136 may include instructions for attempting to transmit one or more transmit messages at a clock rate, and if the clock rate is determined to be excessive, may select a lower clock rate for providing the one or more transmit messages. In some embodiments an iterative search pattern may be employed to selectively increase or decrease the clock rates by different amounts based on prior results for the chip card. This process may be repeated until a clock rate that is optimized for the particular chip card (and other current operational conditions) has been identified. In this regard, the payment reader 22 may be configured to identify a clock signal that permits exchange of messages with the EMV card to continue until the transaction is completed.

In some embodiments, if a clock rate is not determined to be excessive, Clock control instructions 136 may include instructions for selecting and providing the clock signal to the clock connection having at a clock rate that is higher than the initial clock rate. For example, clock control instructions 136 may include instructions for increasing the clock rate provided to the clock connection if a current clock rate is not determined to be excessive, such as when a predetermined number of transmit messages is successfully received by the EMV card or when error rates are less than a threshold.

In some embodiments, Clock control instructions 136 may include instructions for increasing the clock rate (e.g., iteratively by step or otherwise) until a threshold clock rate (e.g., a maximum clock rate) or clock rate measurement (e.g., error rate thresholds) has been reached. For example, if a clock rate is not determined to be excessive based on monitoring of the data connection, EMV instructions 136 may include instructions for selecting a clock signal having a higher clock rate to provide to the clock connection. If the higher clock rate is not excessive (e.g., based on monitoring receive messages or data at the data connection), a clock signal having a higher clock rate may be provided to the clock connection. In this regard, Clock control instructions 136 may include instructions for progressively increasing the clock rate until payment reader 22 reaches a maximum clock rate or begins to miss messages or send incorrect data. In an embodiment the thresholds use to increase the clock rate may be lower than the thresholds used to decrease the clock rates. In some embodiments, once the threshold for clock rate increases is reached, the clock rate may be decreased by a step decrease at which no errors were received or the number of errors was less than the threshold. Note that, in some embodiments, clock control instructions 136 may include instructions may modify the changes in clock rate (e.g., iterative steps, maximums, etc.) based on other operational conditions such transaction-specific information, environmental information, card type, merchant information, customer information, location, etc.

In some embodiments, clock control instructions 136 may include instructions for requesting a next transmit message in response to a determination that a clock rate is excessive. Clock control instructions 136 may include instructions for requesting, receiving and providing information stored at payment reader 22 (e.g., in general memory 122 or cryptographic memory 128) about messages transmitted during a payment transaction. As described below, in some embodiments, receive messages may be stored at the payment reader 22 (e.g., in a receive message cache 182 in cryptographic memory 128). Clock control instructions 136 may include instructions for requesting information about the last successfully received receive message of the one or more receive messages or data received in the receive message. Clock control instructions 136 may include instructions for identifying a next transmit message of the one or more transmit messages to provide to the data connection, such as at the second clock rate. Clock control instructions 136 may include instructions for requesting various data objects and information to minimize interruptions to transaction processing in other embodiments.

In an embodiment, processing of data as part of an initialization process may begin after the EMV card is placed in the EMV slot. Information may be obtained from the card that is used to identify information about the card (e.g., specified clock rates, identifying card information) or that may be used to identify known or probable information about acceptable clock rates for the card (e.g., based on information such as issuer, card type, cardholder, payment system, etc.). Based on this information, the clock control instructions 136 may execute one or more rules to store clock signal frequencies and transmit or receive messages in receive message cache 182 so that processing may be completed even if messages have been provided to the EMV card at an excessive clock rate and resulting messaging errors have occurred. In an embodiment, clock control instructions 136 can identify stored receive messages and allow payment reader 22 to identify the next transmit message to send. The rules of clock control instructions 136 may provide the last receive message when requested. Any data object (e.g., transmit or receive messages, or other data objects that are extracted from a read record) may be stored in the message cache 182 for future use in response to future data object requests.

Upon receipt of a request for data from the EMV card (e.g., based on a data object request), the clock control instructions 136 may perform a number of steps to return the requested information. In an embodiment, the clock control instructions 136 may first query the receive message cache 182 to determine whether the information has already been obtained and stored. If not, it may be determined from the requested information (e.g., transaction processing step, etc.) the next data processing steps that should be performed or next communication requests that should be provided to the EMV card. The current processing of payment transactions at a different clock rate may then continue based on information that has already been obtained, without having to repeat successful transaction processing steps or communications.

Clock control instructions 136 may include rules for managing data in receive message cache 182. For example, rules in clock control instructions 136 may include specifications for determining what information (e.g., data objects, successful transmit or receive messages, etc.) to retain and when to remove or purge a data object from receive message cache 182. In some embodiments, clock control instructions 136 may include instructions for storing a last receive message that was successfully received so that a next transmit message can be identified quickly. In some embodiments, rules in clock control instructions 136 may specify saving a copy of each receive message in receive message cache 182 until it is determined that a clock rate provided to the clock connection is appropriate. In some embodiments, clock control instructions 136 may include instructions for selecting a clock rate based on a clock rate history in receive message cache 182 (e.g., a previously provided clock rate). In some embodiments, clock control instructions 136 may include instructions for providing information that can be used for analysis of clock rates for different card types and conditions, such as to a payment service system 50 that aggregates data to make decisions and develop rules about particular clock rates, EMV cards, and conditions.

Although in the embodiment depicted in FIG. 3 the clock control instructions 136 are depicted and described as being stored within memory 122 and executed by the processing unit 120, it will be understood that clock control instructions 136 may be stored at other memory (e.g., cryptographic memory 128) and executed by other processors (e.g., cryptographic processing unit 125). In a similar manner, receive message cache 182 may be stored other than at cryptographic memory 128 (e.g., at general memory 122) and may be utilized or executed at other processors (e.g., by general processing unit 120). Moreover, it will be understood that any of the instructions or cache may be stored at multiple memories, and that any of the functionality related to EMV processing described herein may be combined in any suitable manner (e.g., into a single software routine or into additional software routines).

Cryptographic processing unit 125 may be any suitable processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be any suitable memory or combination thereof as described herein, and may include a plurality of sets of instructions for performing cryptographic operations, such as payment processing instructions 176 and cryptographic instructions 178. In an embodiment, cryptographic memory 128 may also include a receive message cache 182, which may provide quickly accessible storage of information relating to the EMV card and transactions, such as received EMV card messages or data objects obtained via READ RECORD requests.

Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

Figure 4:
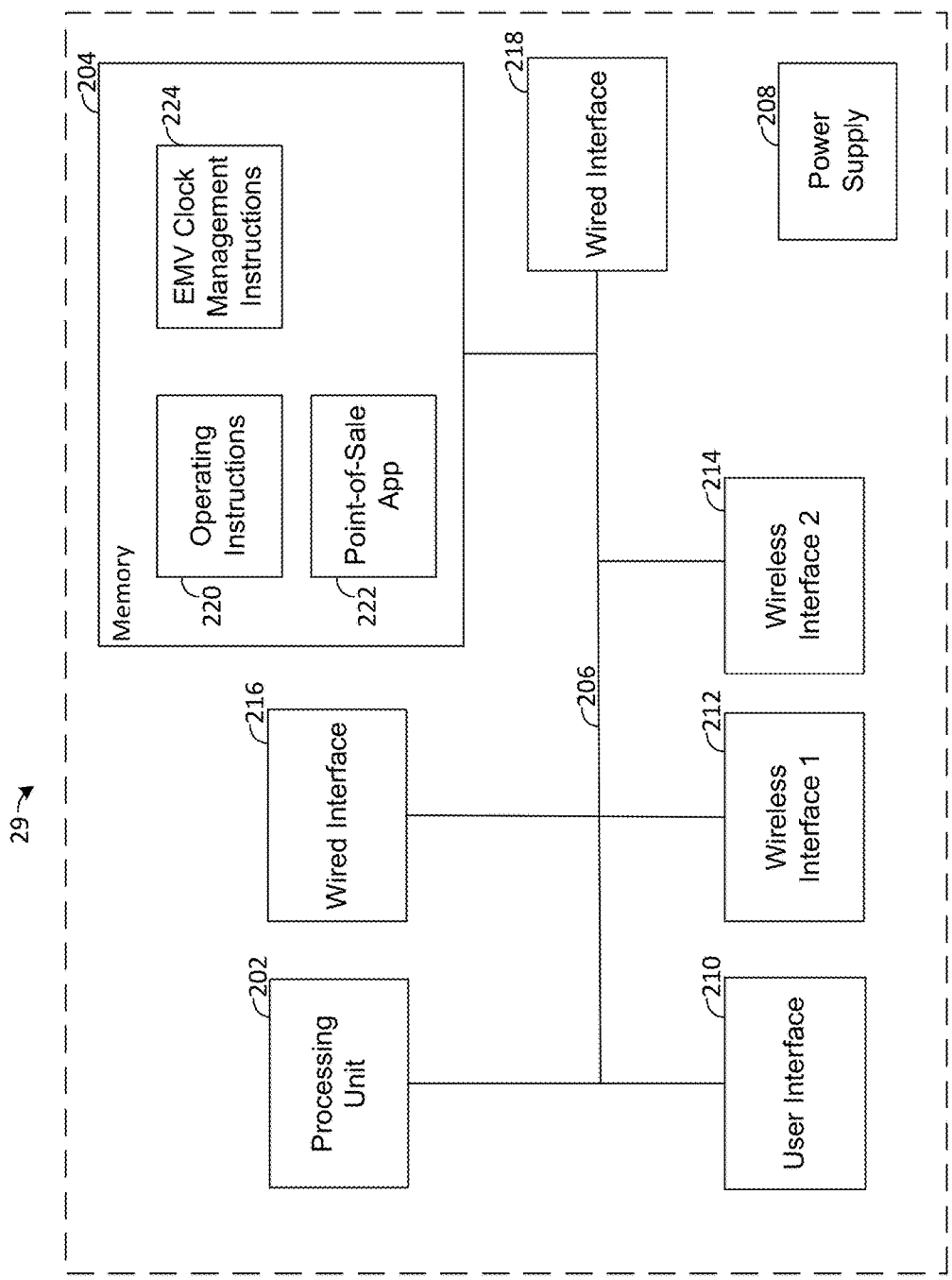
FIG. 4 depicts an illustrative block diagram of a merchant device in accordance with some embodiments of the present disclosure.

FIG. 4 depicts an exemplary merchant device 29 in accordance with some embodiments of the present disclosure. Although a merchant device 29 may be implemented in any suitable manner, in one embodiment the merchant device 29 may be an interactive electronic device that provides a user interface and communicates with one or more other devices. Examples of interactive electronic devices include tablets, smart phones, smart watches, desktop computers, laptop computers, custom electronic devices, and other suitable electronic devices having the necessary user interface and communication capabilities to perform the functions described herein.

Although particular components are depicted in a particular arrangement in FIG. 4, it will be understood that merchant device 29 may include additional components, one or more of the components depicted in FIG. 4 may not be included in merchant device 29, and the components of merchant device 29 may be rearranged in any suitable manner. In one embodiment, merchant device 29 includes a processing unit 202, a memory 204, an interface bus 206, a power supply 208, a user interface 210, a first wireless interface 212, a second wireless interface 214, and a wired interface 216.

In one embodiment, the merchant device 29 includes a processing unit 202 and memory 204 that are configured to control and perform the necessary operations of the merchant device 29. In one embodiment, the processing unit 202 may be a general purpose processor running instructions for a mobile operating system, programs, and applications based on instructions that may be stored in memory 204. The memory 204 may include any suitable memory types or combination thereof as described herein, such as ROM, flash memory, and RAM, for storing instructions and other data and providing a working memory for the execution of the operating system, programs, and applications of the merchant device 29. In one embodiment, the memory 204 may include a plurality of sets of instructions, such as operating instructions 220, point-of-sale application instructions 222, and EMV clock management instructions 224.

The processing unit 202 may execute the instructions of memory 204 to interact with and control one or more other components of the merchant device 29. Although the processing unit 202 may communicate with other components of the merchant device 29 in any suitable manner, in one embodiment the processing unit may utilize an interface bus 206. Interface bus 206 may include one or more communication buses such as I2C, SPI, USB, UART, and GPIO. In one embodiment, the processing unit 202 may execute instructions of the memory and based on those instructions may communicate with the other components of the merchant device 29 via the communication buses of interface bus 206.

Merchant device 29 may also include a power supply 208. Power supply 208 may include power conversion circuitry for converting AC power and/or generating a plurality of DC voltages for use by components of merchant device 29. When power supply 208 includes a battery, the battery may be charged via a physical power connection, via inductive charging, or via any other suitable method. Although not depicted as physically connected to the other components of merchant device 29 in FIG. 4, power supply 208 may supply a variety of voltages to the components of merchant device 29 in accordance with the requirements of those components.

Merchant device 29 may also include a user interface 210. User interface 210 may provide various options for the user of the merchant device 29 to interact with applications and programs running on the merchant device 29. An exemplary user interface 210 may include hardware and software for a suitable user interface, such as a touchscreen interface, voice command interface, keyboard, mouse, gesture recognition, other suitable user interface, or any suitable combination thereof. In one embodiment, the user interface 210 may be a touchscreen interface that displays an interactive user interface for programs and applications such as a point-of-sale application running on the merchant device 29.

Merchant device 29 may also include a plurality of wireless communication interfaces. The wireless communication interfaces may include any suitable hardware and software for providing a wireless communication interface such as Bluetooth classic, Bluetooth low energy, WiFi, cellular, short message service (SMS), NFC, any other suitable wireless communication interface, or any combination thereof. In an embodiment, a first wireless communication interface 212 may be a wireless communication interface that primarily communicates with payment reader 22 (e.g., a Bluetooth low energy interface) while a second wireless communication interface 214 may be a wireless communication interface (e.g., WiFi) that primarily communicates with a payment service system 50 of payment server 40 (e.g., via the internet).

Merchant device may also include a plurality of wired interfaces 216 and 218, which may include any suitable interface for wired communication with other devices or a communication network, such as USB, Lightning, FireWire, Ethernet, any other suitable wired communication interface, or any combination thereof. In an embodiment, wired interface 216 may primarily communicate with payment reader 22 (e.g., via USB) while wired interface 218 may primarily communicate with payment service system 50 (e.g., via Ethernet).

Operating instructions 220 may include instructions for controlling any suitable general operations of the merchant device 29, such as internal communications, power management, control of I/O devices, control of communication devices, control of other hardware of the merchant device 29, any other suitable instructions, or any combination thereof. In one embodiment, the operating instructions may provide instructions for the operating system of the merchant device 29 as well as most drivers, programs, and applications operating on the merchant device 29.

Operating instructions 220 may include instructions for controlling the operations of the user interface 210. The user interface 210 may be controlled in accordance with the instructions of programs and applications of the operating instructions 220, point-of-sale application instructions 222, and EMV clock management instructions 224. Operating instructions 220 may also include instructions for interacting with a payment reader 22 and for interacting with a payment service system 50 at a payment server 40. The payment reader 22 and/or the application running on the merchant device 29 may be known (e.g., via a registration process) to the payment service system 50, such that the merchant device 29 may process payments with the payment service system 50 according to the point-of-sale application instructions 222.

Point-of-sale application instructions 222 include instructions for running a point-of-sale application on the merchant device 29. When executed by the processing unit 202, the point-of-sale application instructions 222 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations.

EMV clock management instructions 224 may provide operations and services for assisting with the processing of payment transactions at payment reader 22 and the intake and processing of information related to EMV card processing speed information at payment service system 50. In an integrated payment terminal (e.g., where functionality of the payment reader 22 and merchant terminal are integrated into a single device) the functionality of EMV clock management instructions 224 may be integrated at the integrated payment terminal (e.g., with clock control instructions 136 and receive message cache 182).

In an embodiment, EMV clock management instructions 224 may assist with selecting a clock rate during payment transactions. Aspects of the processing described for payment reader 22 (e.g., aspects of clock control instructions 136 and receive message cache 182) may be offloaded to merchant terminal 29. EMV clock management instructions 224 may assist with predictive selection of clock rates, execution of rules for identifying clock rate selection rules, and storage and processing of information that is acquired from the EMV card at different clock rates (e.g., to enable continuous operation while different clock rates are being utilized).

In an embodiment, EMV clock management instructions 224 may provide local processing to modify or create clock rate selection rules. As described in more detail with respect to the operations of payment service system 50, data from numerous payment transactions may be aggregated and analyzed to generate rules for predictive selection of appropriate clock rates, storage and processing of received information, modifications to clock rates based on comparisons to thresholds and other information (e.g., card information, customer information, merchant information, environmental information, transaction information, etc.), and similar functionality to expedite the process of identifying the appropriate clock rate to be provided to an EMV chip card and adjusting the clock rate. A particular merchant terminal 29 may receive information from a limited number of sources (e.g., a limited subset of payment readers 22 that connect to the merchant device 29, other merchant devices on shared networks, other merchant devices operated by the same entity, sensors of the merchant device, etc.). That limited information may be used to generate independent local rules (e.g., without regard to whether any rules are received from payment service system 50), or in some embodiments, modifications to global rules received from payment service system 50.

In an exemplary local rule, the merchant devices 29 may operate in a particular locality where a large percentage of EMV cards have similar specified clock rates, or where only a limited number of card types are used. Local rules may be created that prioritize clock rate selection based on these known likely clock rates, and may supplement or displace global rules in some embodiments.

In another exemplary local rule, merchants may have customer information (e.g., from loyalty programs, etc.) that may identify customers and associate customers with known EMV cards. In this manner, a library of payment cards and associated specified EMV card clock rates may be pre-loaded once a customer is identified. In an embodiment, customers may be identified by merchant biometric or monitoring systems (e.g., facial recognition, morphology, RFID devices, WiFi connections, GPS, cellular data, etc.) upon entering a queue, merchant location, or proximity to a merchant location, such that specified EMV card clock rate information may be identified and pre-loaded for the EMV cards previously used by the particular customer.

EMV clock management instructions 224 may also provide data to the payment service system 50 from payment reader 22. This information may include card information, customer information, customer/specified EMV card clock rate associations, utilization of EMV cards having particular specified clock rates in processing payment transactions (e.g., clock rates that are frequently or infrequently used in payment transactions), and other similar information. This information may be forwarded to the payment service system, and in some embodiments, additional information may be appended. The additional information may be any suitable information that may be acquired by the merchant terminal 29, such as customer information, customer preference information, geographic information, store-specific information, environmental information, purchased items, and other suitable information.

EMV clock management instructions 224 may also facilitate updates to the clock control instructions 136 and the receive message cache 182. In some embodiments, EMV clock management instructions 224 may modify firmware updates received from payment service system 50 based on local rules.

Figure 5:
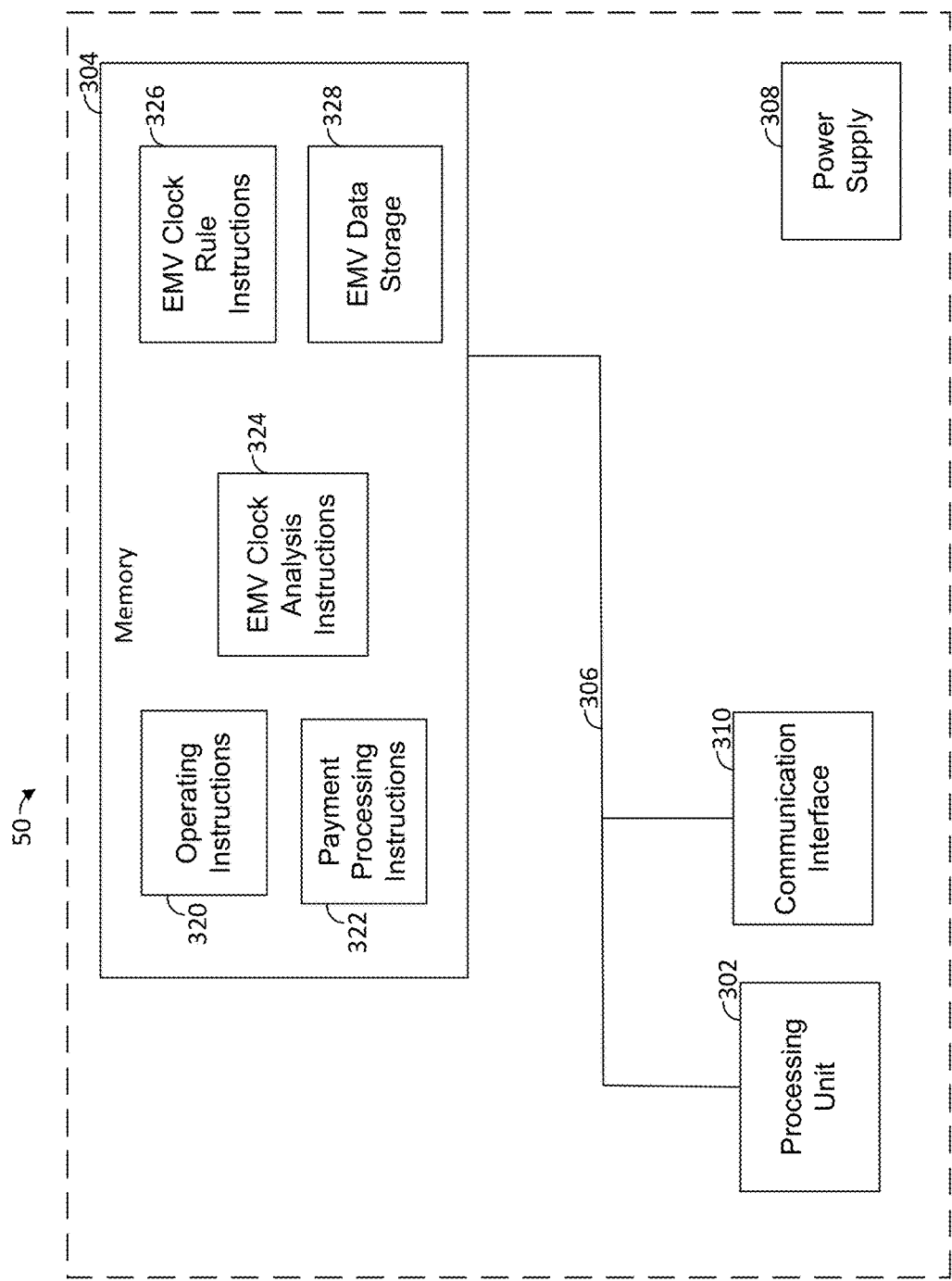
FIG. 5 depicts an illustrative block diagram of a payment service system in accordance with some embodiments of the present disclosure.

FIG. 5 depicts an exemplary payment service system 50 of a payment server 40 in accordance with some embodiments of the present disclosure. Although the payment service system 50 is depicted as a single server, it will be understood that the operations and memory of the payment service system 50 may be distributed over any suitable number of servers. Although particular components are depicted in a particular arrangement in FIG. 5, it will be understood that the payment service system 50 may include additional components, one or more of the components depicted in FIG. 5 may not be included in the payment service system 50, and the components of payment service system 50 may be rearranged in any suitable manner. It will also be understood that, in some embodiments, payment service system 50 may include the necessary components and have the necessary configuration to perform any of the functionality attributed to the payment server 40 herein. In one embodiment, payment service system 50 includes at least a processing unit 302, a memory 304, an interface bus 306, a power supply 308, and a communication interface 310.

In one embodiment, the payment service system 50 includes a processing unit 302 and memory 304 that are configured to control and perform the necessary operations of the payment service system 50. In one embodiment, the processing unit 302 of may be a high-speed processor running instructions for an operating system for the server, programs, and applications based on instructions that may be stored in memory 304. The memory 304 may include any suitable memory types or combination thereof as described herein for storing instructions and other data and providing a working memory for the execution of the operating system, programs, and applications of the payment service system 50. In one embodiment, the memory may include a plurality of sets of instructions, including but not limited to operating instructions 320, payment processing instructions 322, EMV clock analysis instructions 324, and EMV clock rule instructions 326. Memory 304 may also include EMV data storage 328, which may provide for storage of information relating to clock rates for EMV cards, such as clock rate history for payment cards, card information, customer information, merchant information, and environmental information.

The processing unit 302 may execute the instructions of memory 304 to interact with and control one or more other components of the payment service system 50. Although the processing unit 302 may communicate with other components of the payment service system 50 in any suitable manner, in one embodiment the processing unit 302 may utilize an interface bus 306. Interface bus 306 may include one or more communication buses such as I2C, SPI, USB, UART, and GPIO. In one embodiment, the processing unit 302 may execute instructions of the memory 304 and based on those instructions may communicate with the other components of the payment service system 50 via the communication buses of interface bus 306.

The payment service system 50 may also include a power supply 308. Power supply 308 may include power conversion circuitry for converting AC power and/or generating a plurality of DC voltages for use by components of the payment service system 50. In some embodiments, power supply 308 may include a backup system such as a battery backup, to avoid interruptions in service during power outages. Although not depicted as physically connected to the other components of the payment service system 50 in FIG. 5, power supply 308 may supply a variety of voltages to the components of the payment service system 50 in accordance with the requirements of those components.

The payment service system 50 may also include a communication interface 310. Although communication interface 310 may include any suitable communication interface or combination thereof, in some embodiments, the communication interface 310 may utilize higher speed communication interfaces such as WiFi, cellular, Ethernet, or fiber optics. The communication interface 310 may establish a secured connection (e.g., via TLS or SSL) with a payment terminal 20 (e.g., payment reader 22 via merchant device 29) in order to exchange messages relating to transactions to be processed, information relating to clock rates provided to EMV cards, firmware updates, application updates, etc. The communication interface 310 may also communicate with other servers of the payment server 40 such as payment servers, which may, in some embodiments, be located remotely from the payment service system 50 and operated by different entities than those that control the payment service system 50. For example, in one embodiment, the payment service system 50 may be operated by an entity that provides one or more of the payment reader 22, merchant device 29, or point-of-sale application 222. Payment servers may be associated with and operated by one or more of the merchant, issuer, or customer banks.

Memory 304 may include a plurality of data stores and a plurality of sets of instructions for performing the processing operations of the payment service system 50, such as operating instructions 320, payment instructions 322, EMV clock analysis instructions 324, EMV clock rule instructions 326, EMV data storage 328, and other suitable instructions and data stores for use in operating the payment service system 50 (e.g., instructions related to the operation of one or more other applications or components of the payment service system 50).

Operating instructions 320 may include instructions for controlling suitable general operations of the payment service system 50, such as internal communications, power management, control of communication devices, control of other hardware of the payment service system 50, any other suitable instructions, or any combination thereof. In one embodiment, the operating instructions may provide instructions for the operating system of the payment service system 50 as well as most drivers, programs, and applications operating on the payment service system 50

Operating instructions 320 may also include instructions for interacting with a merchant device 29. In one embodiment, the payment service system 50 may communicate with the merchant device 29 via the communication interface 310. Operating instructions 320 may include instructions that when executed by processing unit 302 control these communications and provide for secure communication by implementing procedures such as TLS, SSL or as encrypted data based on keys.

Payment processing instructions 322 include instructions for processing payments, and may control the content of messages that are communicated to the merchant device 29, payment reader 22 (e.g., via merchant device 29), and/or payment servers. In one embodiment, the payment processing instructions may include information about each payment reader 22 and merchant device 29 having an installed point-of-sale application 222. In addition to performing payment processing functions such as providing payment information such as amount and a credit card number to a transaction processing system and communicating responses back to the merchant, the payment service system 50 may also perform complex analysis of merchant data that may be used to provide reports, metrics, or other data to a merchant (e.g., a merchant operating a plurality of merchant devices 29 at a plurality of locations). Payment processing instructions 322 may also include instructions for accessing encryption keys such as a shared private key or a key of a public/private key pair for encrypting and decrypting data provided by one or more of a payment device 10, payment reader 22, or merchant device 29.

EMV data storage 328 may provide a repository for storage of information relating to EMV transactions, such as EMV card clock rate rules, information relating to EMV card clock rates that is used to generate those rules, other data related to the determination and control of EMV clock rates, and any other suitable information related to operation of the payment terminal and payment system. In an embodiment, the stored data may include information relating to specified EMV card rates and other related information from transactions with payment readers that are in communication with the payment service system, message failure rates, related transaction information (e.g., payment system information, issuer information, etc.), store and customer information (e.g., provided by merchant terminals, environmental information, etc.), other suitable data, and associations therebetween. The stored data may also include rules for processing transactions based on such information, which may be organized for selection based on global, national, and local factors, e.g., to determine which EMV card rate rules should be provided to which merchant terminals and payment readers. In an exemplary embodiment, rules may be targeted based on information such as updates to EMV cards, merchant type, particular merchants, locality, customer demographics, environmental factors, etc., that may be associated with particular known or probable EMV cards and appropriate clock rates.

EMV clock analysis instructions 324 may assist with determining appropriate clock rates during payment transactions with connected payment terminals. Aspects of the processing described for payment reader 22 (e.g., aspects of clock control instructions 136 and receive message cache 182) and/or merchant terminal 29 (e.g., EMV clock management instructions 224) may be offloaded to the payment service system 50. EMV clock analysis instructions 324 may assist with predictive selection of EMV clock rates, execution of rules for identifying EMV clock rates, parallel processing of payment transaction steps, and identification of information that may be used to determine likely EMV card and clock rate utilization (e.g., customer information, etc.).

EMV clock rule instructions 326 may provide for the creation, association, and storage of rules for selecting EMV card clock signal frequencies. As described herein, information may be provided from a variety of sources that may be determined to be associated with known or probable EMV cards and appropriate clock rates. Payment service system 50 may receive this information for a very large number of transactions on a daily basis, from a very large number of merchants and payment terminals. This data may be analyzed using a variety of techniques (e.g., supervised or unsupervised machine learning) in order to identify rules for identifying rules for selecting clock rates, such as initial clock rates and rules for iteratively modifying clock rates. These rules may be hierarchical such that global rules may apply to large categories of payment terminals, with numerous levels of modification and refinement applying to particular sub-categories such as merchant type, location, customer demographics, issuer card types, environmental factors, etc. EMV clock rule instructions 326 may provide for the generation of software updates that may be provided to payment terminals, e.g., to update instructions and stored record and data object information.

Figure 6:
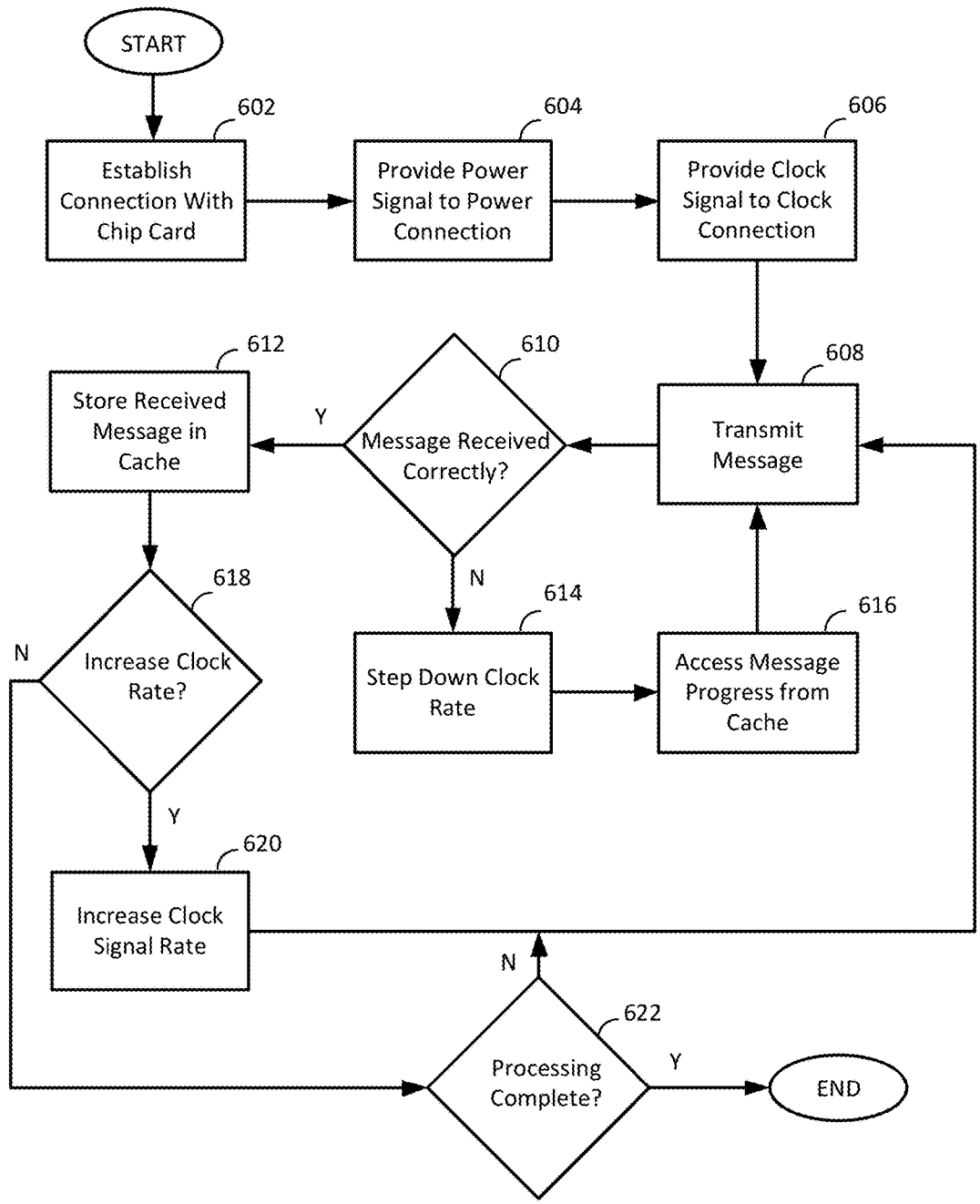
FIG. 6 depicts a non-limiting flow diagram illustrating exemplary steps for selecting a clock rate to provide to an EMV card in accordance with some embodiments of the present disclosure.
Figure 7:
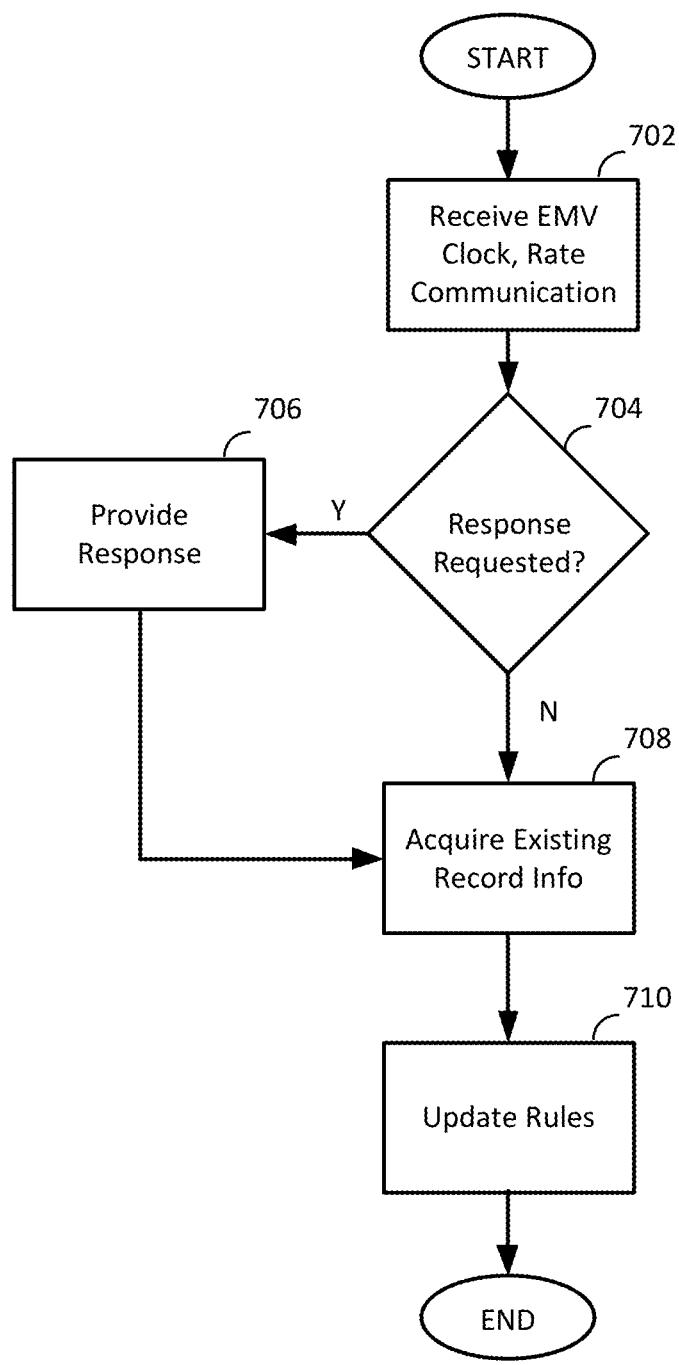
FIG. 7 depicts a non-limiting flow diagram illustrating exemplary steps for server-assisted selection of a clock rate to provide to an EMV card in accordance with some embodiments of the present disclosure.

In view of the structures and devices described supra, methods that can be implemented in accordance with the disclosed subject matter will be better appreciated with reference to the flowcharts of FIGS. 6-7. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts a non-limiting flow diagram illustrating exemplary steps for selection of a clock rates for a clock signal to be provided to by a payment terminal to an EMV card in accordance with some embodiments of the present disclosure.

Processing of FIG. 6 may start at step 602 by establishing a physical connection with an externally-driven processing device such as an EMV chip of an EMV card. As described herein, the EMV card may have various physical connections (e.g. pins) for physically connecting to a payment terminal (e.g., at payment reader 22). A physical connection may be established between the payment terminal and EMV card by inserting the EMV card into the payment terminal (e.g., the contact interface of payment reader 22). In some embodiments, the physical connections may comprise a power connection, a ground connection, a clock connection, a reset connection, a data connection, and other additional connections. Once the EMV card is inserted, various signals may be exchanged with the EMV card via the physical connection. In some embodiments, the payment terminal may provide a power signal, a ground signal, and a clock signal to the EMV card, which may allow the EMV card to power up end perform operations based on the clock rate of the clock signal. Once the payment terminal has established a physical connection with the EMV card, at step 602, processing may continue to step 604.

At step 604, power may be provided to the EMV card via the power and ground pins of the EMV card and payment terminal. As described herein, the payment terminal may provide a power signal and ground to the EMV card via the physical connection established at step 602 (e.g., power connection). After the payment terminal provides power to the EMV card, processing may continue to step 606.

At step 606, a clock signal may be provided to the EMV card's clock connection for use in processing a data signal received at the data connection during a payment transaction. In some embodiments, the first clock signal may be provided having a first clock rate and may be selected based on EMV card clock rate selection rules in a manner that improves processing speed of payment transactions, as described herein. For example, in some embodiments, information may be received before the card is inserted (e.g., merchant information, transaction information, customer information, environmental information, etc.) that may be used to select an initial clock rate. In some embodiments (not depicted in FIG. 6), an initial clock rate may be provided until identifying information is received from the card, after which a new clock rate may be selected. Once the initial clock rate has been selected and provided, processing may continue to step 608.

At step 608, the payment terminal may provide one or more transmit messages to the EMV card, such as by providing the one or more transmit messages to the physical data connection of the EMV card. The one or more transmit messages may be provided to the EMV card based on the initial clock rate. Once the one or more transmit messages have been provided to the data connection of the EMV card, processing may continue to steps 610.

At step 610, the payment terminal may monitor the data connection for one or more receive messages from the EMV card to determine whether the EMV card has received the one or more transmit messages correctly and whether the EMV card is able to properly perform processing information (e.g., whether the initial clock rate is excessive). The payment terminal may determine that one or more transmit messages were not received correctly based on information such as the type of receive message (e.g., a request to re-transmit), failure to receive the receive message within a threshold time, or incorrect or corrupt data received within the payload of the receive message (e.g., exceeding a threshold error rate). If it is determined from the receive messages that the EMV card received the one or more transmit messages correctly and was able to properly process a response, processing may continue to step 612, at which the receive message is stored in a cache (e.g., in receive message cache 182) before continuing to step 618. If the one or more receive messages indicate that the one or more transmit messages were not received or processed correctly by the EMV card, processing may continue to step 614.

At step 614, after it has been determined that processing of the EMV card was not performed properly at the initial clock ate at step 610, the payment terminal may select a second clock rate that is less than the initial clock rate. The second clock rate may be determined in a variety of manners as described herein, such as the specified clock rate for the EMV card (if the initial clock rate was greater than the specified clock rate), based on an iterative rate selection process, based on other information (e.g., customer information, merchant information, transaction information, location, environmental information, etc.), measurements of received signals from the EMV card, or information stored off-device (e.g., received from a merchant device or payment server). In some embodiments, other characteristics of the clock signal may change, such as the duty cycle, slew rate, etc. In some embodiments, other signals such as the power signal may be modified (e.g., to increase the voltage provided on the power connection). After the payment terminal determines the second clock rate and/or other signal modifications, the signals provided to the EMV card may be modified and processing may continue to step 616.

At step 616, the payment terminal may access receive message progress stored in the cache (e.g., receive message cache 182) to determine the next transmit message. In some embodiments, the payment terminal may determine message progress based on receive message progress (e.g., with reference to the most recent receive messages or data stored in receive message cache 182). After message progress has been accessed and a next step in transaction processing has been determined, processing may return to step 608, where messaging may continue using the modified clock signal. As depicted in FIG. 6, in some embodiments this processing may continue through multiple iterations at which the clock rate may be increased (at step 620), decreased (at step 614), or retained at the same rate (step 622).

At step 618, after it has been determined that the current clock rate is not excessive, payment terminal may determine whether to increase clock rate, such as based on rate selection rules. For example, if no errors were determined from the receive messages or payload data, or if other information indicates that conditions are suitable for a higher clock rate, processing may continue to step 620, where the payment terminal may increase the clock rate (e.g., based on selection rules) and/or other signal characteristics can provide the updated signals to the EMV card. After the rate of the clock signal has been increased, processing may return to step 608, where the payment terminal may use the clock signal with increased rate to transmit the one or more transmit messages. If clock rate should not be increased at step 618, processing may continue to step 622.

At step 622, it may be determined whether the processing of the transaction between the payment terminal and the EMV card is complete. If the processing is not complete, processing may return to step 608. If the processing is complete, the steps of FIG. 6 may end.

FIG. 7 depicts a non-limiting flow diagram illustrating exemplary steps for server-assisted selection of an EMV card clock rate in accordance with some embodiments of the present disclosure. The steps of FIG. 7 may be performed by suitable computing devices and/or software modules that are in communication with device and/or software modules that receive an EMV card, select a clock rate, and process payment transactions based using the selected clock rate. In exemplary embodiments, the processing steps of FIG. 7 may be performed by a merchant device, a payment service system, or a combination thereof.

Processing may begin at step 702, at which a communication regarding an EMV card clock rate may be received. As described herein, various information may be communicated regarding EMV card processing, such as requests to assist in processing (e.g., to identify likely EMV card or clock rate utilization information), EMV card communication history information for analysis, and other information such as customer information, merchant information, transaction information, location, environmental information, etc. As described herein, this information may be utilized to assist in determining whether a clock rate should be changed, the type of change to the clock rate (e.g., via iterative or other methods), and modifications to local criteria that are provided to a payment terminal via software updates. Once the communication is received, processing may continue to step 704.

At step 704, it may be determined whether the communication requires a response. If a response is required, processing may continue to step 706. If a response is not required, processing may continue to step 708.

At step 706, the response to the communication may be identified and transmitted. In some embodiments, the response may include information such as an EMV card clock rate to select, a sequence or range of clock rates to attempt, information to request from the EMV card, a sequence of transaction processing steps, software updates, and/or libraries of known specified EMV card clock signal rates for reference at the transaction processing device. Once the response is transmitted, processing may continue to step 708.

At step 708, existing clock rate information may be acquired for analysis. As described herein, EMV data storage may include information about clock rate history from numerous EMV cards and transactions, as well other information that may be useful in determining appropriate clock rates for EMV cards under different conditions. Existing information may include the raw data, existing rules, data models, and/or other suitable information. Once the existing record information is acquired, processing may continue to step 710.

At step 710, the clock rate rules may be updated based on information in the newly received communication. As described herein, a hierarchy of rules may be provided and updated based on newly acquired information. In some embodiments, updates may be performed at different intervals (e.g., periodically) and/or based on a quantity or type of acquired data (e.g., based on a certain volume of new data being acquired). Once the rules are updated, the processing of FIG. 7 may end.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for communicating with a processing device, the method comprising:
    providing a clock signal to the processing device from a reader device, the clock signal having a first clock rate;
    providing one or more transmit messages to the processing device from the reader device;
    receiving, at the reader device, one or more receive messages from the processing device;
    determining, at the reader device, that the first clock rate is excessive based on the one or more receive messages indicating that the processing device is unable to correctly respond to the transmit messages when operating at the first clock rate;
    determining, at the reader device, a second clock rate for the clock signal that is less than the first clock rate based on the determination that the first clock rate is excessive;
    providing, from the reader device, the clock signal to the processing device at the second clock rate;
    transmitting one or more additional transmit messages to the processing device from the reader device;
    receiving, at the reader device, one or more additional receive messages from the processing device after transmitting the one or more additional transmit messages;
    determining, at the reader device, that the second clock rate is not excessive based on the one or more additional receive messages indicating that the processing device is able to correctly respond to the transmit messages when operating at the second clock rate; and
    processing a transaction with the processing device at the second clock rate after the determination that the second clock rate is not excessive.

2. The method of claim 1, further comprising establishing a physical connection with the processing device, wherein the physical connection comprises a clock connection and a data connection, wherein the clock signal is provided to the processing device via the clock connection, and wherein the receive messages and transmit messages are exchanged with the processing device via the data connection.

3. The method of claim 2, wherein establishing the physical connection further comprises establishing a power connection, wherein a power signal is provided to the processing device via the power connection.

4. The method of claim 1, wherein the first clock rate is greater than a specified clock rate for the processing device.

5. The method of claim 4, wherein the second clock rate is less than or equal to the specified clock rate for the processing device.

6. The method of claim 1, wherein the first clock rate is determined to be excessive based on a failure to receive one of the receive messages within a timeout threshold, based on an error rate of one of the receive messages exceeding an error rate threshold, or based on one of the receive messages indicating that one of the transmit messages was not received by the processing device.

7. The method of claim 1, wherein the determination of the second clock rate is based on customer information, merchant information, transaction information, location, or environmental information.

8. The method of claim 1, further comprising storing data in a receive message cache, the data comprising the one or more receive messages or payload data from the one or more receive messages.

9. The method of claim 1, further comprising:
    receiving one or more additional receive messages after providing the clock signal at the second clock rate;
    determining that the clock rate of the clock signal may be increased based on the one or more additional receive messages;
    determining a third clock rate for the clock signal that is greater than the second clock rate based on the determination that the clock rate may be increased; and
    providing the clock signal to the processing device at the third clock rate.

10. A method for communicating with a processing device, the method comprising:
    providing, from a reader device, a clock signal to the processing device, the clock signal having a first clock rate;
    providing, from the reader device, one or more transmit messages to the processing device;
    determining, at the reader device, that the processing device is unable to correctly respond to the transmit messages when operating at the first clock rate;
    determining, at the reader device, a second clock rate for the clock signal that is less than the first clock rate based on the determination that the processing device is unable to correctly respond to the transmit messages when operating at the first clock rate;
    providing, from the reader device, the clock signal to the processing device at the second clock rate; and
    processing a transaction with the processing device at the second clock rate.

11. The method of claim 10, wherein the first clock rate is greater than a specified clock rate for the processing device.

12. The method of claim 11, wherein the second clock rate is less than or equal to the specified clock rate for the processing device.

13. The method of claim 10, wherein the determining that the processing device is unable to correctly respond to the transmit messages based on a failure to receive a receive message from the processing device within a timeout threshold, based on an error rate of receive messages from the processing device exceeding an error rate threshold, or based on a receive message from the processing device indicating that one of the transmit messages was not received by the processing device.

14. The method of claim 10, wherein the transaction is a payment transaction.

15. A reader device for processing transactions with a processing device, the system comprising:
   a clock interface that provides a clock signal from the reader device to the processing device;
   a communication interface that exchanges one or more messages with the processing device;
   a memory having instructions stored thereon;
   a processing unit coupled to the clock interface, the communication interface, and the memory, wherein the processing unit executes the instructions to:
      set the clock signal to a first clock rate;
      provide one or more transmit messages to the communication interface for transmission of the transmit messages to the processing device;
      determine that the processing device is unable to correctly respond to the transmit messages when operating at the first clock rate;
      determine a second clock rate for the clock signal that is less than the first clock rate based on the determination that the processing device is unable to correctly respond to the transmit messages when operating at the first clock rate;
      set the clock signal to the second clock rate;
      provide one or more additional transmit messages to the communication interface for transmission of the additional transmit messages to the processing device;
      determine that the processing device is able to correctly respond to the additional transmit messages when operating at the second clock rate; and
      process a transaction with the processing device at the second clock rate after determining that the processing device is able to correctly respond to the additional transmit messages when operating at the second clock rate.

16. The reader device of claim 15, wherein the clock interface provides for a physical connection to a clock pin of the processing device and wherein the data connection provides for a physical connection with a data pin of the processing device.

17. The reader device of claim 16, further comprising a power interface that provides for a physical connection to a power pin of the processing device, wherein a power signal is provided to the processing device via the power interface.

18. The reader device of claim 15, wherein the first clock rate is greater than a specified clock rate for the processing device.

19. The reader device of claim 18, wherein the second clock rate is less than or equal to the specified clock rate for the processing device.

20. The reader device of claim 15, wherein the processing device is determined to be unable to correctly respond to the transmit messages when operating at the first clock rate based on a failure of the processing unit to receive a receive message from the processing device within a timeout threshold, based on an error rate of receive messages from the processing device exceeding an error rate threshold, or based on a receive message from the processing device indicating that one of the transmit messages was not received by the processing device.

21. The reader device of claim 15, wherein the determination of the second clock rate is based on customer information, merchant information, transaction information, location, or environmental information.

22. The reader device of claim 15, wherein the instructions further cause the processor to:
   determine that a clock rate of the clock signal may be increased;
   determine a third clock rate for the clock signal that is greater than the second clock rate based on the determination that the clock rate may be increased; and
   set the clock signal to the third clock rate.

23. A non-transitory computer-readable storage medium for use in a reader device, the non-transitory computer-readable medium comprising instructions stored therein, which when executed by one or more processors, cause the one or more processors to perform operations comprising:
   causing the reader device to provide a clock signal to a processing device, the clock signal having a first clock rate;
   causing the reader device to provide one or more transmit messages to the processing device;
   determining that the processing device is unable to correctly respond to the transmit messages when operating at the first clock rate;
   determining a second clock rate for the clock signal that is less than the first clock rate based on the determination that the processing device is unable to correctly respond to the transmit messages when operating at the first clock rate;
   causing the reader device to provide the clock signal to the processing device at the second clock rate;
   causing the reader device to provide one or more additional transmit messages to the processing device;
   determining that the processing device is able to correctly respond to the additional transmit messages when operating at the second clock rate; and
   processing a transaction with the processing device at the second clock rate after determining that the processing device is able to correctly respond to the additional transmit messages when operating at the second clock rate.

24. The non-transitory computer-readable storage medium of claim 23, wherein the first clock rate is greater than a specified clock rate for the processing device.

25. The non-transitory computer-readable storage medium of claim 24, wherein the second clock rate is less than or equal to the specified clock rate for the processing device.

26. The non-transitory computer-readable storage medium of claim 23, wherein the processing device is determined to be unable to correctly respond to the transmit messages when operating at the first clock rate based on a failure of the one or more processors to receive a receive message from the processing device within a timeout threshold, based on an error rate of receive messages from the processing device exceeding an error rate threshold, or based on a receive message from the processing device indicating that one of the transmit messages was not received by the processing device.

27. The non-transitory computer-readable storage medium of claim 23, wherein the determination of the second clock rate is based on customer information, merchant information, transaction information, location, or environmental information.

28. The non-transitory computer-readable storage medium of claim 23, wherein the instructions further comprise instructions that cause the one or more processors to perform operations comprising:
   determining that a clock rate of the clock signal may be increased;

determining a third clock rate for the clock signal that is greater than the second clock rate based on the determination that the clock rate may be increased; and causing the reader device to provide the clock signal to the processing device at the third clock rate.

* * * * *